June 19, 1956     S. R. HOWARD     2,751,180
PACKAGING AND CHECK WEIGHING MACHINE
Filed Nov. 24, 1952     5 Sheets-Sheet 1

INVENTOR.
Stanley R. Howard
BY J. Stanley Churchill
ATTORNEY

June 19, 1956  S. R. HOWARD  2,751,180
PACKAGING AND CHECK WEIGHING MACHINE
Filed Nov. 24, 1952  5 Sheets-Sheet 2

INVENTOR.
Stanley R. Howard
BY
J. Stanley Churchill
ATTORNEY

June 19, 1956  S. R. HOWARD  2,751,180
PACKAGING AND CHECK WEIGHING MACHINE
Filed Nov. 24, 1952  5 Sheets-Sheet 4

INVENTOR.
Stanley R. Howard
BY J. Stanley Churchill
ATTORNEY

June 19, 1956  S. R. HOWARD  2,751,180
PACKAGING AND CHECK WEIGHING MACHINE
Filed Nov. 24, 1952  5 Sheets-Sheet 5

INVENTOR.
Stanley R. Howard
BY J. Stanley Churchill
ATTORNEY

United States Patent Office 2,751,180
Patented June 19, 1956

2,751,180

PACKAGING AND CHECK WEIGHING MACHINE

Stanley R. Howard, Milton, Mass., assignor to Pneumatic Scale Corporation, Limited, Quincy, Mass., a corporation of Massachusetts Application November 24, 1952, Serial No. 322,306

13 Claims. (Cl. 249—17)

This invention relates to a packaging machine and more particularly to a packaging machine for forming and delivering successive measured loads.

The invention has for an object to provide a novel and improved packaging machine of the character described in which provision is made for supplying flowable solid material to be formed into successive measured loads and for sampling from time to time the material being thus supplied, and provision is made for check weighing a predetermined volume of said sample material and for automatically adjusting the machine to vary the volume of the measured loads in accordance with the variations in the check-weighed load from a predetermined weight whereby to enable the machine to deliver successive loads of substantially uniform weight.

With this general object in view and such others as may hereinafter appear, the invention consists in the volumetric filling machine and in the various structures, arrangements and combinations of parts hereinafter described and particularly defined in the claims at the end of this specification.

In the drawings illustrating the preferred embodiment of the invention.

In general, the present invention contemplates a volumetric filling machine of the type wherein successive measured loads are formed from material being supplied to the machine. Provision is made for sampling the material being thus supplied, either intermittently or continuously, and for check weighing predetermined volumes of the sampled material. Provision is also preferably made for adjusting the mechanism for forming the successive measured loads in accordance with variations of the check-weighed loads from a predetermined weight whereby to enable the machine to deliver measured loads of substantially a predetermined weight.

Referring now to the drawings, the invention is herein illustrated as embodied in a rotary filling machine of the general type illustrated and described in the United States patent to Delamere et al. No. 1,527,030 and which, as herein shown, may comprise a generally circular non-rotating hopper 10 containing a supply of the material delivered thereto by gravity or otherwise through a supply pipe 12 connected to a main source of supply, and a series of telescopically adjustable measuring chambers 14 preferably equally spaced in a circle and mounted to revolve beneath the hopper 10 to receive their loads. As illustrated in plan in Fig. 1, the hopper 10 is irregular in shape, having a side wall 11 of large radius in one portion of its circumference arranged to extend over a plurality of the chambers 14 to cause filling thereof as the chambers pass under the extended portion of the hopper. The hopper is also provided with a side wall 13 formed on a smaller radius so that as the chambers are rotated around such side wall they are maintained out of contact with the material in the hopper and are open to the atmosphere.

Figures 3, 14:
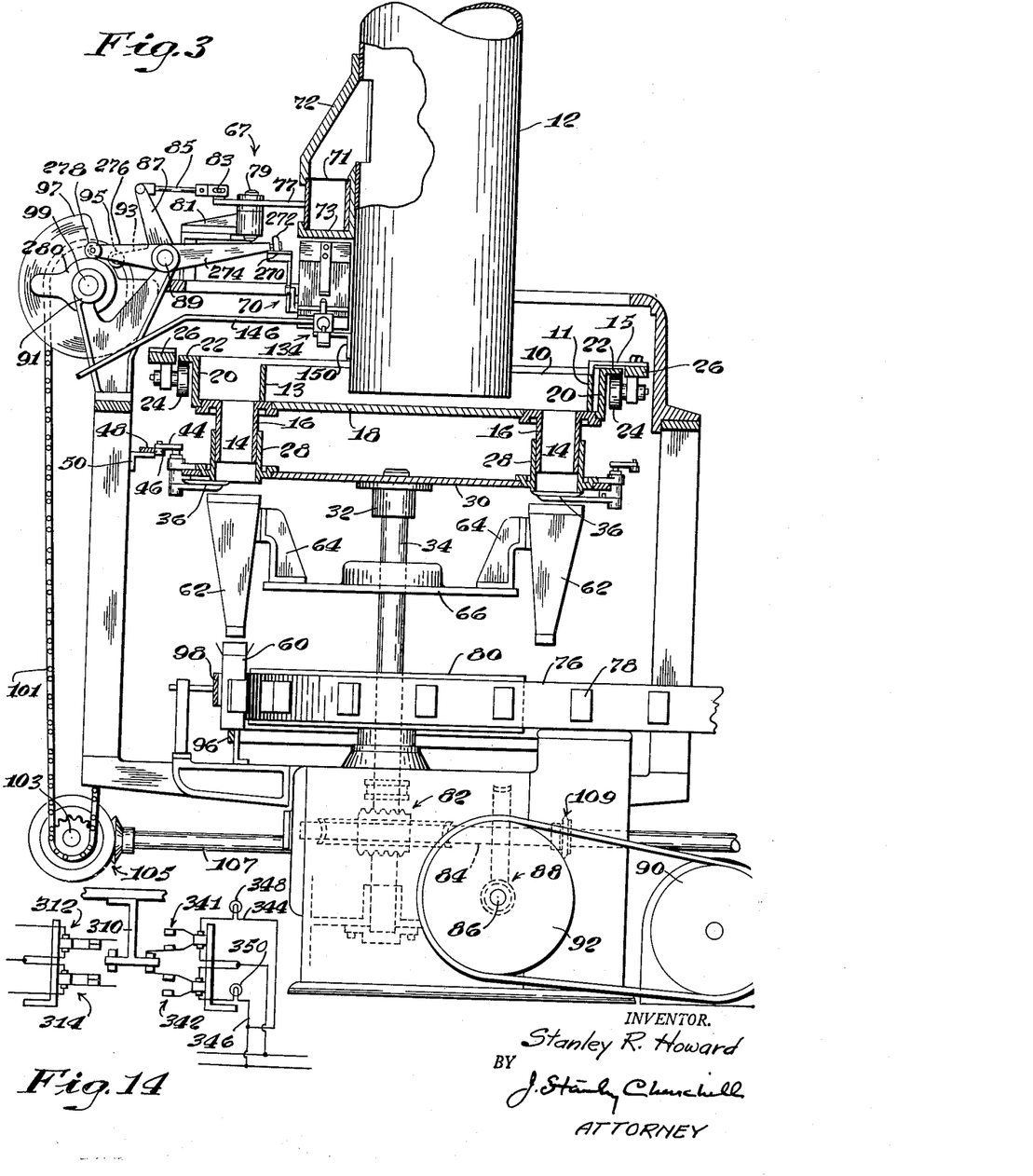
Fig. 3 is a vertical section taken on the line 3—3 of Fig. 1.
Fig. 14 is a wiring diagram of signal means to be described.

As illustrated in Fig. 3, the upper portions of the telescopically adjustable measuring chambers 14 may comprise a plurality of flanged tubes 16 supported in and depending from a rotary disk 18 which forms the bottom of the hopper 10. The rotary disk 18 is provided with an upstanding annular side wall 20 having a flange or track portion 22 arranged to ride on and be supported by a plurality of rollers 24 carried by a vertically adjustable supporting ring 26. The lower portions of the measuring chambers 14 may comprise a plurality of corresponding upstanding tubes 28 telescopically fitted about the upper tubes 16 and supported in a rotary disk 30 secured by a flange member 32 to the upper end of a continuously rotated central shaft 34, the telescoping connection imparting rotary movement to the upper portions of the chambers 14 during the operation of the machine. The stationary hopper 10 resting on the rotary disk 18 is attached to the vertically adjustable supporting ring 26 by brackets 15 to prevent rotation of the hopper relative to the disk.

Figures 4, 7, 8, 9, 10:
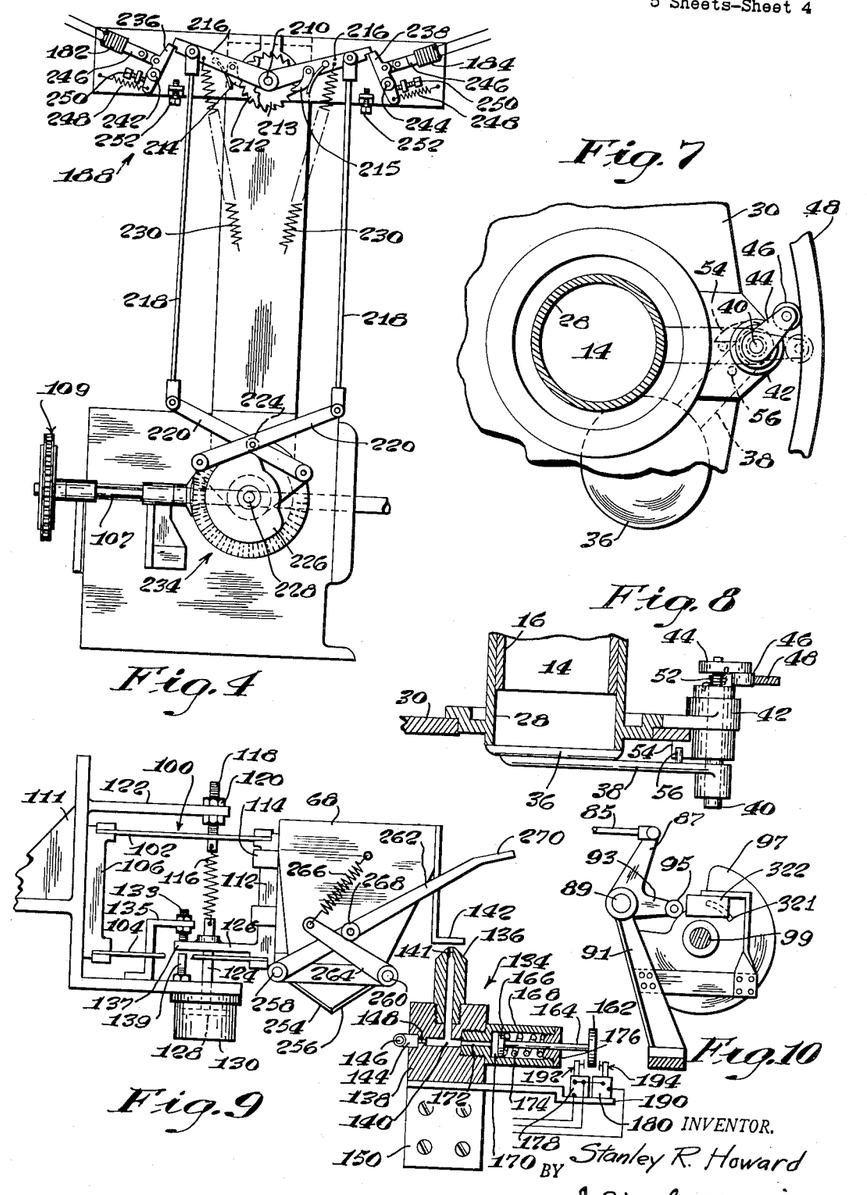
Fig. 4 is a front elevation of the volume correcting mechanism shown in Fig. 2.
Fig. 7 is a plan view detail of a measuring-chamber closing valve shown in its open position.
Fig. 8 is a side elevation of the same partly in cross section.
Fig. 9 is a side elevation of the check-weighing mechanism shown in Fig. 2, some of the parts being shown in cross section.
Fig. 10 is a detail view in side elevation of a cam and associated linkage as viewed from the line 10—10 of Fig. 1.
Figure 5:
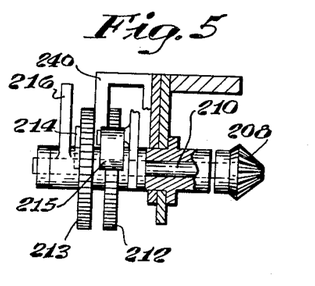
Fig. 5 is a detail view partly in cross section of a portion of the correcting mechanism.

As herein shown, each chamber 14 is provided with a cam-operated bottom closure valve 36, and in the operation of the machine, successive measuring chambers are filled as they pass under the filling portion 11 of the stationary hopper 10, at which time the bottoms of the chambers 14 are closed by the valves 36, and when the chambers pass out from under the filling portion of the hopper, the valves may be moved to open the bottoms of the chambers to release the measured loads. As illustrated in Figs. 3, 7 and 8, each cam-operated valve 36 may be mounted on an arm 38 fast on the lower end of a vertical stud 40 rockingly supported in a bearing member 42 attached to the outer edge of the rotary disk 30 adjacent each measuring chamber 14. The upper end of the vertical stud 40 may be provided with an arm 44 also fast thereon and carrying a cam roll 46 for cooperation with a cam piece 48 supported by brackets 50 extended from the machine frame. A coil spring 52 interposed between the upper arm 44 and the bearing member 42, and having its ends connected to the arm 44 and member 42 respectively, is arranged to urge the valve 36 in a clockwise or closed position as shown in dotted lines in Fig. 7, and engagement of the roll 46 with the cam piece 48 is arranged to rock the valve in a counter-clockwise direction to open the bottom of the chamber and effect release of the measured load. A stop lug 54 extended from the lower end of the bearing member 42 is arranged to cooperate with an upstanding pin 56 carried by the valve arm 38 to limit the closing position of the valve.

Figure 1:
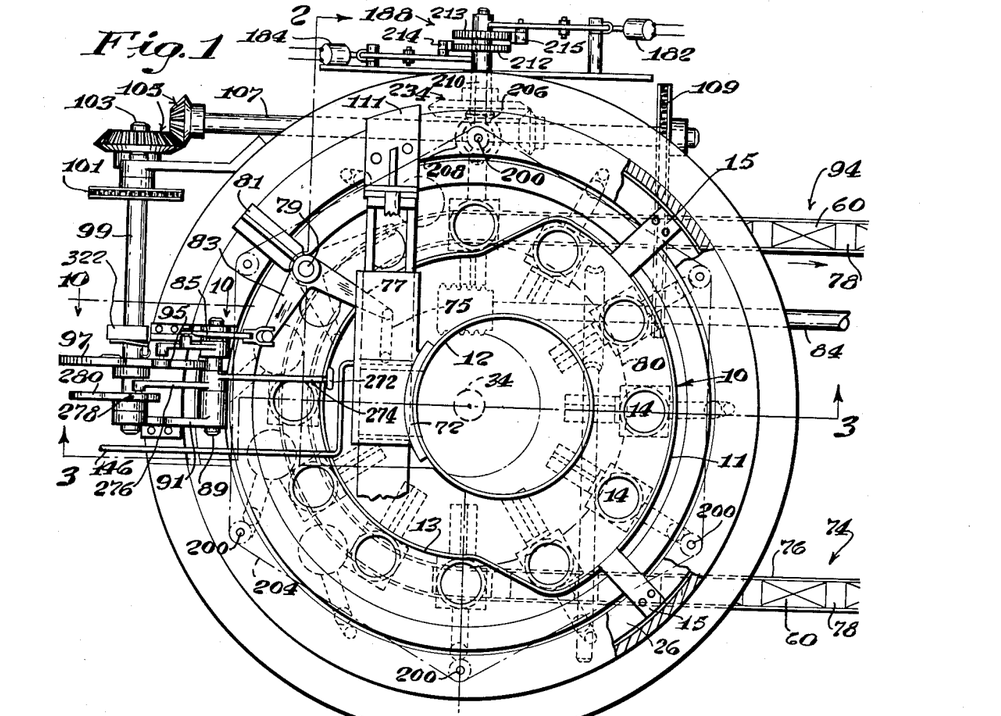
Fig. 1 is a plan view of the present volumetric filling machine.
Figure 6:
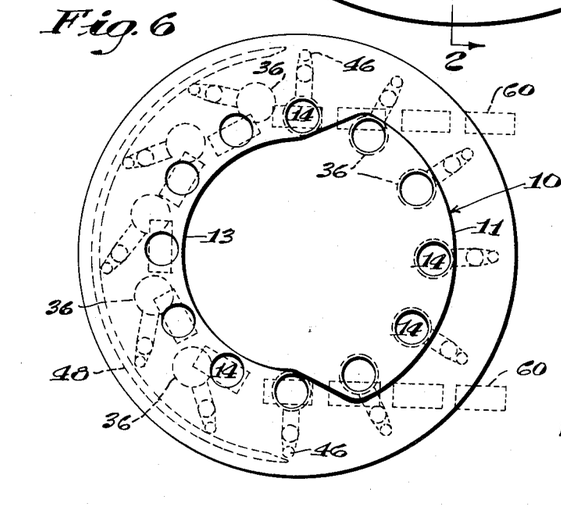
Fig. 6 is a diagrammatic plan view indicating the sequence of operations performed during a complete revolution of the filling mechanism.

As herein illustrated, all of the measured loads in the chambers 14 are released into successive cartons 60 being moved along therebeneath, the material being guided into the cartons through funnels 62 supported by brackets 64 attached to a rotary disk 66 fast on the central shaft 34. As shown in Fig. 1, the cartons 60 may be delivered to the machine along a conveyer 74 by an upstanding flexible metal belt 76 having a series of spaced blocks 78 attached thereto and between which the cartons are engaged. The belt 76 is arranged to cooperate with a driving pulley 80 fast on the central shaft 34 and arranged to register successive cartons in alignment with their respective filling units. As illustrated in Fig. 3, the central shaft 34 may be driven through a worm-gear drive 82 connected to a shaft 84 which in turn may be connected to a drive shaft 86 through a second worm-gear drive 88. The drive shaft 86 may be driven by an electric motor 90 belted to a pulley 92 fast on the shaft 86. In the operation of the filling machine, the cartons may be delivered along the conveyer 74 from a supply thereof, and successive cartons 60 are arranged to come into alignment with successive filling units at the point of tangency of the conveyer 74 with the semicircular path through which the cartons are guided through the machine, the cartons remaining in alignment with their respective filling units through 180° and then being delivered from the machine on a discharge conveyer 94. The cartons may be guided through the semicircular path on a bottom supporting rail 96 and by a side rail 98, as shown in Fig. 3. As indicated in Fig. 6, the bottoms of the measuring chambers 14 are closed by the valves 36 during the travel of the chambers under the filling portion 11 of the hopper 10, and when the chambers 14 arrive in alignment with their respective cartons the valves 36 are opened to release the measured loads.

Figures 2, 13:
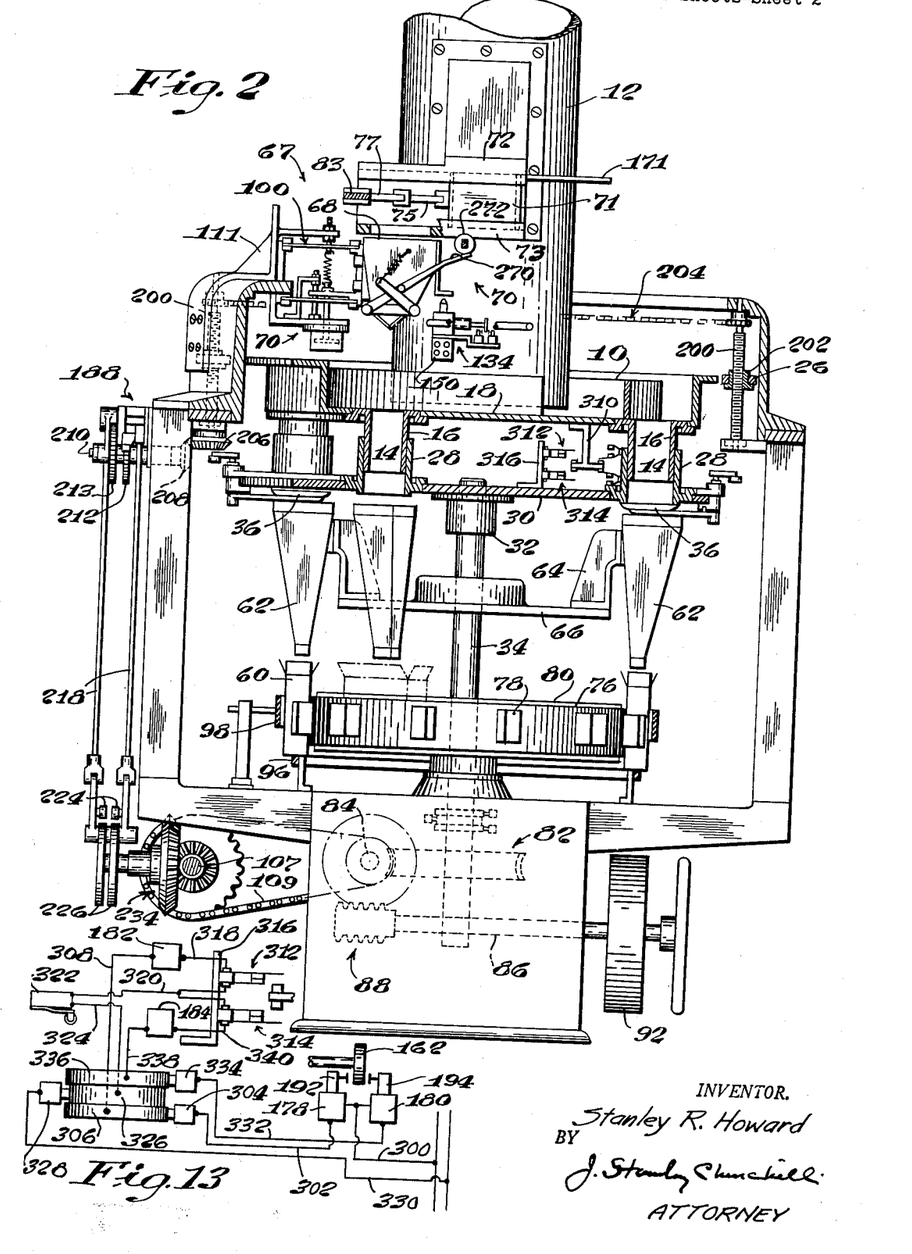
Fig. 2 is a side elevation partly in cross section as viewed from the line 2—2 of Fig. 1.
Fig. 13 is a wiring diagram for controlling the volume-correcting mechanism.

In accordance with the present invention, a predetermined volume of the material comprising a test load is periodically withdrawn from the supply of material immediately prior to its being delivered into the hopper 10, and as herein shown from the supply pipe 12, and weighed during the operation of the machine by load-pretesting mechanism indicated generally at 67 in Fig. 2, and provision is made for automatically correcting the volume of the telescopic measuring chambers 14 by adjusting the upper portions 16 of the chambers relative to the lower portions 28 when the weight of the test load as detected by a weighing unit 70 is found to deviate abnormally either above or below commercially acceptable limits, as will be hereinafter more fully described.

As illustrated in Figs. 2 and 3, the pretesting mechanism 67 includes a rectangular measuring chamber 71 operatively connected to one side of the supply pipe 12 and arranged to withdraw the material therefrom, and to transfer the withdrawn material into the weighing unit 70. The rectangular measuring chamber 71 is open at its upper and lower ends and is slidingly mounted in a guide bracket 72 attached to the side of the supply pipe 12. In one position of operation, as shown in Figs. 2 and 3, the upper end of the measuring chamber 71 is in communication with the interior of the supply hopper 12, the bottom end of the measuring chamber being closed by the lower wall 73 of the bracket 72. The chamber is arranged to be moved from the material-receiving position shown to a position immediately above the weighing unit 70 by cam-operated linkage including a link 75 connecting the chamber to one arm 77 of a bell crank pivotally supported at 79 in a bracket 81 attached to the machine frame. The other arm 83 of the bell crank is connected by a link 85 to one arm 87 of a cam lever rockingly mounted on a shaft 89 supported in a bracket 92 attached to the machine frame. The other arm 93 of the cam lever is provided with a cam roll 95 arranged to cooperate with a cam 97 fast on a cam shaft 99 supported in the bracket 91. The cam shaft 99 may be driven through a chain and sprocket drive 101 connecting the shaft 99 to a shaft 103. The shaft 103 is connected by bevel gears 105 to a drive shaft 107 which in turn is connected by a chain and sprocket drive 109 to the drive shaft 84. The weighing unit 70 is disposed immediately below an opening in the lower wall 73 of the guide member 72 to receive the material through the open lower end of the measuring chamber 71 when the latter is moved through the linkage above described. As shown in Fig. 2, when the chamber 71 is moved from its position in communication with the pipe 12 the opening in the side of the pipe is cut off by a blade 171 extended rearwardly from the chamber 71. Thus, in operation a predetermined volume of material is periodically withdrawn from the supply pipe and delivered to the weighing unit 70 during the operation of the machine.

As illustrated in Fig. 9, the weighing unit includes a weighing receptacle 68 attached to and forming a part of the free end of a cantilever spring beam 100, herein shown as comprising two upper and two lower relatively stiff cantilever leaf springs 102, 104 of equal length, the leaf springs being connected at their inner ends to a rigid immovable member 106 attached to a bracket 111 secured to the machine frame. The other ends of the leaf springs 102, 104 may be secured to a second rigid member 112 to which the weighing receptacle 68 is attached by straps 114. The two rigid members 106, 112 together with the leaf springs 102, 104 constitute a four-bar linkage so that when a load is placed within the weighing receptacle, the weight thereof results in imparting to the receptacle a straight-line motion in a vertical direction so that every particle in the weighing receptacle moves with the same displacement, direction and velocity and so that any particle produces the same spring deflection no matter where it is located in the receptacle. The weighing beam 100 is also provided with a coil spring 116 arranged to exert a counterforce upon the spring beam, the spring 116 being connected at its upper end to a bolt 118 adjustably secured by nuts 120 in an arm 122 extended from the bracket 111. The lower end of the coil spring 116 may be connected to a rod 124 fast in an arm 126 extending from and integral with the rigid member 112 of the spring beam 100. The rod 124 may extend below the arm 126 and may be provided with a piston 128 operating in oil contained in a dash pot 130 attached to the underside of a lower arm 132 extended from the bracket 111. The cantilever spring beam 100 may be adjustably limited in its vertical movement by an upper adjusting screw 133 carried by a bracket 135 attached to the arm 132, the screw 133 being engageable with the upper surface of an extended portion 137 of the arm 126, and by a lower stop screw 139 secured to the arm 132 and engageable with the undersurface of the extended portion 137. In practice, the coil spring 116 serves to counteract the weight of the weighing receptacle 68 and associated parts which are mounted upon the outer ends of the leaf springs, the coil spring 116 being of such strength as to support nearly all of the weight of the measured load being check weighed without deflection of the leaf springs so that the deflection of the leaf springs may be proportionate to the deviation in weight above a predetermined minimum weight limit. For example, a load weight of 15 ounces may be used, and weights above 15 ounces will deflect the leaf springs proportionately to the excess above 15 ounces.

In the illustrated embodiment of the invention, provision is made for measuring the deflection of the spring beam 100 when depressed by the load being check weighed to indicate the weight of the load and more particularly to detect any deviation over or under a predetermined weight beyond commercially acceptable tolerances. In practice, the stiff cantilever springs 102, 104 are selected so that the weighing beam has a relatively small deflection value, and sensitive pneumatically operated control means indicated generally at 134 is arranged to cooperate with the present spring beam for indicating or measuring the relatively small deflection of the spring beam when depressed by the load released from a measuring chamber 71. The pneumatically operated unit 134 is constructed so that a large pressure change occurs upon deflection of the spring beam through a minute distance, and in general, the deflection of the spring beam is arranged to increase the pressure in the pneumatically operated unit by an amount proportionate to the deflection, an overweight load effecting a relatively large increase in pressure, and an underweight load decreasing the pressure or increasing the pressure a lesser amount, and such different pressures may be translated into movement to effect closing of either an overweight or an underweight switch for actuating the volume-correcting mechanism whereby to effect a decrease or an increase respectively in the volume of the measuring chambers 14 when an abnormal deviation from a predetermined weight of the fixed volume is detected.

As shown in Fig. 9, the pneumatically operated control mechanism 134 may comprise a conduit or jet member 136 carried by a block 138 having a chamber 140 communicating with the jet and through which air under substantial pressure may be caused to flow to be discharged through a small discharge orifice 141 in the jet arranged to cooperate with a valve member 142 carried by and movable with the receptacle 68. The inlet 144 may be supplied with a regulated source of air through a pipe 146, and the chamber 140 is provided with a restricted throat portion 148 adjacent its inlet end arranged to offer a substantial resistance to the flow of air therethrough. The block 138 may be secured to a bracket 150 attached to the side wall of the supply pipe 12. The inlet pipe 146 may be connected to any usual or preferred regulated source of compressed air. In operation, the spring-beam unit 100 may be adjusted to maintain the valve member 142 in a slightly elevated position spaced from the small discharge orifice 141, and upon minute deflection of the spring beam under the influence of the load, the valve 142 is moved toward the discharge orifice a minute amount, thereby effecting a substantial pressure rise in the chamber 140 between the discharge orifice 141 and the restricted throat portion 148.

As herein shown, provision is made for utilizing the increase in pressure in the chamber 140 to effect movement of a contact-closing member 162 formed on one end of a piston rod 164 having a head 166 at its other end and supported for reciprocation in a laterally extended cylinder 168 connected to the block 138. The cylinder 168 is provided with a chamber 170 communicating with the pressure chamber 140 through a passageway 172, and a spring 174 coiled about the rod 164 and interposed between the piston head 166 and the end wall 176 of the cylinder is arranged to normally urge the rod 164 and the contact member 162 to the left, viewing Fig. 8. The contact member 162 is arranged to cooperate with either of two switches comprising an underweight circuit-closing switch 178 or an overweight circuit-closing switch 180 connected in the appropriate circuit to effect energization of solenoids 182 or 184 respectively, the solenoids forming a part of the volume-correcting mechanism, indicated generally at 188, see Fig. 4. The switches 178, 180 may be supported in suitably spaced relation on a bracket 190 attached to the machine frame.

In operation, when a normal or predetermined weight load is received in the weighing receptacle 68, the deflection of the spring beam and movement of the valve member 142 toward the discharge orifice 141 will be such as to effect a pressure rise in the chamber 140 sufficient to extend the contact member 162 to an intermediate position between the two switches 178, 180, as illustrated in Fig. 9, so that neither switch is closed when the pre-test load is found to be of a predetermined normal weight, and no correction of volume of the measuring chambers will be made. However, in the event that the load check weighed is found to be abnormally underweight, the valve member 142 will be moved toward the discharge orifice 141 a relatively lesser distance, and as a result the rise in pressure in the chamber 140 will be correspondingly less so as to extend the contact member 162 to a position to engage a switch-closing pin 192 of the underweight switch 178 and energization of the solenoid 182 to cause the correcting mechanism to effect an increase in the volume of the measuring chambers 14. On the other hand, should the load being check weighed be found to be abnormally overweight, the valve member 142 will be moved relatively closer toward the discharge orifice 141 resulting in a pressure rise in the chamber 140 sufficient to extend the contact member 162 a relatively greater distance outwardly to engage the switch-closing pin 194 of the overweight switch 180 to subsequently effect closing of the circuit to energize the overweight solenoid 184 to cause the correcting mechanism 188 to effect a decrease in the volume of the measuring chambers 14.

Referring now to Figs. 1, 2 and 4, the correcting mechanism 188 for automatically adjusting the upper portions 16 of the measuring chambers 14 relative to the lower portions 28 thereof to vary the volume of the chambers 14 when the weight of the measured load is found to deviate abnormally beyond the commercially acceptable limits as detected by the check-weighing unit 70 may include a plurality of screws 200 rotatably mounted in the machine frame and arranged to cooperate with nuts 202 secured in the supporting ring 26. The screws 200 may be connected to rotate together by a chain and sprocket drive 204, and one of the screws may be provided with a bevel gear 206 arranged to mesh with a bevel gear 208 fast on a shaft 210 mounted for rotation in the machine frame. In operation, rotation of the screws 200 in one direction will effect elevation of the upper portions 16 of the measuring chambers to increase the volume of subsequent loads, and rotation of the screws in the opposite direction will cause the upper portions 16 of the chambers to be lowered into the lower portions 28 to decrease the volume of the chambers.

As herein illustrated, the correcting mechanism 188 adapted to be controlled in the manner described by the check-weighing unit 70 may include a pair of integral opposed ratchets 212, 213 fast on the shaft 210 and arranged to be engaged by similar spring-pressed pawls 214, 215 to effect rotation of the shaft 210 and adjustment of the chambers 14 when permitted to do so by the check-weighing mechanism. The pawls 214, 215 are carried by similar arms 216 pivotally mounted on the shaft 210, each arm being connected by similar links 218 to cam levers 220 pivotally mounted at 222. Each lever 220 is provided with a roller 224 arranged to cooperate with similar cams 226 fast on a cam shaft 228, the arms 216 being provided with springs 230 arranged to urge the linkage downwardly to permit the rollers to follow their cams. The cam shaft 228 is arranged to be rotated from the shaft 84 through the chain and sprocket drive 109 and bevel gears 234.

The pawl-carrying arms 216 are normally maintained in an elevated or locked position, as shown, by solenoid operated latch members 236, 238 arranged to engage the ends of the arms, and the pawls are prevented from engaging their respective ratchets by a shield member 240 supported from the machine frame. As herein shown, the latch members 236, 238 are pivotally mounted at 242, 244 respectively and are connected by similar links 246 to their respective solenoids 182, 184. Springs 248 cooperating with adjustable stops 250 are arranged to hold the latch members 236, 238 in latched engagement with their respective arms 216, and in operation, when one or the other of the arms is released by its solenoid, the respective arm 216 is rocked downwardly by its spring 230 permitting the roller 224 to follow its cam 226, the pawl riding off the shield 240 and engaging with its racthet to effect rocking of the shaft 210 and adjustment of the measuring chambers 14, as described. The downward rocking movement of the arms 216 may be adjustably limited by stop screws 252.

As above described, the solenoid 182 is connected in the circuit with the underweight switch 178 and in operation, the solenoid 182 is arranged to be energized to effect release of the latch 236 when the switch is closed by the contact-closing member 162, and the other solenoid 184 is connected in the circuit with the overweight switch 180 and is arranged to be energized to effect release of the latch 238 when the switch 180 is closed, thus effecting automatic adjustment of the measuring chambers 14 through definite increments when the pneumatically operated detecting mechanism 134 of the check-weighing unit 70 detects an abnormal deviation beyond commercially acceptable limits from a predetermined weight. During the vertical adjustment of the tubes 16 with the disk 18, the hopper 10 supported on the disk 18 is moved along therewith by virtue of the brackets 15 connected between the vertically adjustable supporting ring 26 and the hopper 10.

After the check-weighing, detecting and correcting operations are completed, provision is made for releasing the weighed load from the weighing receptacle 68 into the hopper 10 to be added to the material being supplied to the measuring chamber 14, and as herein shown, the weighing receptacle 68 may be provided with a pair of shutters 254, 256 fast on rocker pins 258, 260 mounted in suitable bearings carried by the receptacle. The rocker pins 258, 260 are provided with arms 262, 264 respectively fast thereon, one of the arms 264 being provided with a spring 266 connected thereto and arranged to urge the shutter 256 to its closed position. The other arm 262 is provided with a roller 268 engageable with the arm 264 to effect simultaneous movement of the shutters 254, 256 to their closed position, as shown in Fig. 9. In order to open the shutters 254, 256 to effect release of the weighed load into the hopper 10, the arm 262 is extended to terminate in a flat portion 270 arranged to cooperate with a roller 272 carried by one arm 274 of a two-armed lever pivotly mounted at 89. The second arm 276 is provided with a cam roll 278 arranged to cooperate with a cam 280 fast on the cam shaft 99. Thus, in operation, each periodically weighed test load is released into the hopper 10 and reset in readiness for a succeeding test load withdrawn from the supply pipe 12.

Referring now to Fig. 13, the wiring diagram therein illustrated includes the underweight circuit-closing switch 178 and the volume-correcting solenoid 182 for increasing the volume of the chambers 14, and the overweight circuit-closing switch 180 and the corresponding solenoid 184 for decreasing the volume of the chambers. As herein shown, when the load being check weighed is indicated as being underweight, the contact member 162 will be moved into engagement with contact 192 to close the circuit at switch 178. Switch 178 is provided with a lead 300 from the main line and a lead 302 to a brush 304 engaging a contact ring 306 which is connected by a lead 308 to the solenoid 182. Provision is made for limiting the adjustment of the chambers 14 in either direction, and as indicated in Fig. 2, a bracket 310 is connected to the underside of the disk 18. The bracket 310 is provided with an extension arranged to engage either of upper and lower limiting switches 312, 314 respectively which may be mounted on a bracket 316 attached to the disk 30. Accordingly, the solenoid 182 is connected to the upper switch 312 by a lead 318, the switch 312 being normally closed unless engaged by the extension of the bracket 310 when the upper portion of the chambers have been adjusted to a predetermined limit. The switch 312 is provided with a lead 320 connected to a cam-operated microswitch 322 which, as indicated in Fig. 10, is arranged to be closed by a contact member 321 carried by cam 97 during a predetermined portion of the cycle, that is, at a time when the load being tested has been introduced into and settled in the receptacle 68 in readiness for being checked. The circuit is completed through a lead 324, contact ring 326, brush 328 and lead 330 to the main line. The overweight circuit-closing switch 180 is connected to the volume-correcting solenoid 184 in a similar manner, switch 180 being provided with a lead 332 to a brush and contact unit 334, 336 and lead 338 to the solenoid 184. The solenoid 184 is connected by a lead 340 to the lower limit switch 314, the overweight circuit also being connected through the cam-operated microswitch 322 so as to effect operation of the volume-control mechanism during a portion of the cycle when the check-weighing operation is completed.

From the above description it will be observed that the present volumetric filling machine is adapted to check weight a predetermined volume or test load of the material being packaged prior to the introduction of the material into the measuring chambers. Such predetermined volume may be substantially the same as or proportionate to a measured load formed in the measuring chambers 14. In practice, the weight of such predetermined volume remains substantially uniform for a particular run or batch of material, and any variation in weight or specific gravity of such predetermined volume will be relatively small over or under a normal weight for such volume. In operation, when the limit of adjustment of the measuring chamber 14 in either direction is reached, the circuit will be opened at switch 312 or 314 to prevent further operation of the volume-control mechanism in one direction of operation, the other switch remaining closed to effect adjustment in the opposite direction when required. The limiting switches may be adjustably spaced to maintain a predetermined maximum or minimum volume having a weight within allowable tolerances of the normal weight. As illustrated in Figs. 2 and 14, provision is also made for providing a signal when the limit of adjustment in either direction is reached. As best shown in Fig. 14, a second extension from the bracket 310 is arranged to engage one or the other of upper and lower switches 341, 342 to close either of circuits 344, 346 respectively to light a lamp 348 when the limit in one direction is reached, or lamp 350 when the limit in the other direction is reached.

Figure 11:
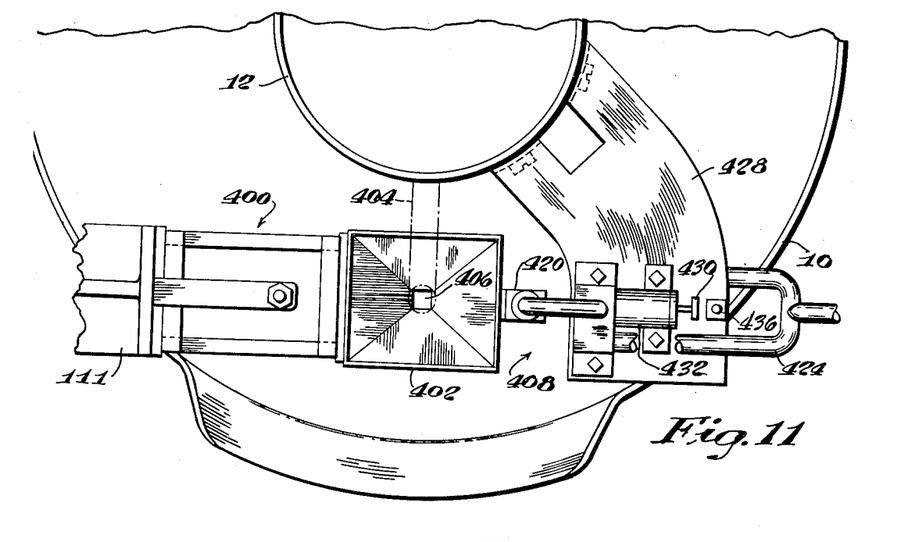
Fig. 11 is a plan view of a modified form of the load-testing mechanism embodied in the present volumetric filling machine.
Figure 12:
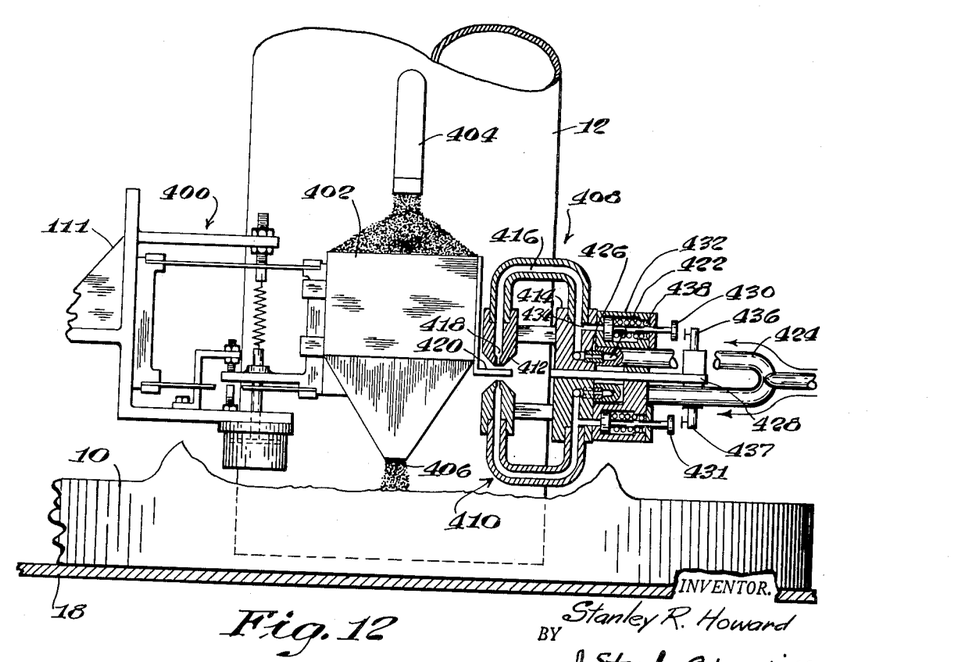
Fig. 12 is a side elevation of the same partly in cross section.

Referring now to Figs. 11 and 12, a modified form of the present volumetric filling machine may comprise check-weighing mechanism including a cantilever scale beam unit 400 and a receptacle 402 mounted thereon which is arranged to receive a continuous flow of material from the supply pipe 12 through a conduit 404 communicating with the side wall of the supply pipe and terminating immediately above the receptacle 402. The lower end of the receptacle 402 is provided with an opening 406 through which material continuously flows into the hopper 10 at a substantially uniform rate corresponding to the rate of flow of material into the upper end of the receptacle. Thus, a substantially uniform amount of the material is contained in the receptacle 402 at all times during the operation of the machine, and any variation in the weight of such substantially uniform amount may be detected, and the corresponding volume-correcting unit may be operated to effect a correction in the volume of the measuring chambers accordingly. The cantilever scale beam unit 400 may and preferably will be similar in construction and mode of operation to that illustrated in Fig. 9 and may be supported from the bracket 111, as shown.

The pneumatically operated control means for measuring the deflection of the spring beam 400 when depressed by the load being check weighed to detect any deviation over or under a predetermined weight may comprise a duplex type control including an upper control unit 408 and a lower control unit 410. Each unit 408, 410 may be similar in construction and mode of operation, each being provided with a conduit or jet 412 carried by a block 414 having a chamber 416 communicating with the jet and through which air under substantial pressure may be caused to flow to be discharged through a small orifice 418 in the jet. As illustrated in Fig. 12, the two jets 412 are disposed in opposed and spaced relation and are arranged to cooperate with a valve member 420 carried by and movable with the receptacle 402, the valve member being extended in the space between the opposed jets. The inlet 422 of each control unit may be supplied with a regulated source of compressed air through a pipe 424, and each chamber 416 is provided with a restricted throat portion 426 adjacent its inlet end arranged to offer a substantial resistance to the flow of air therethrough. The block 414 may be secured to an outboard bracket 428 attached to the side wall of the supply pipe 12. In operation, the spring beam unit 400 may be adjusted to maintain the valve member 420 in an intermediate position between the two opposed air jets 412 so that when a predetermined normal weight is maintained in the receptacle 402 the pressures in the chambers will be equal. However, when the load is less than a predetermined weight, the valve 420 will move upwardly toward the discharge orifice 418 of the upper unit 408 thereby effecting a substantial pressure rise in the upper chamber and a corresponding drop in pressure in the lower chamber, such pressure being arranged to effect movement of contact-closing member 430 formed on a piston rod supported for reciprocation in a laterally extended cylinder 432 connected to the block 414. The cylinder is provided with a passageway 434 communicating with the pressure chamber 416 and a spring 438 coiled about the piston rod and interposed between the piston head, and the end wall of the cylinder is arranged to normally urge the rod and the contact member 430 to the left viewing Fig. 12. In operation, when the valve member 420 is moved toward the upper jet 412 indicating a lightweight load, the pressure in the upper chamber will increase to effect movement of the contact member 430 to the right into engagement with contact 436 arranged to close the circuit to volume-control chambers 14 in a direction to increase the volume of the chambers. Conversely, when the valve member 420 is moved toward the lower jet indicating an abnormally heavy load, the pressure in the lower chamber will increase to effect movement of the lower contact member 431 to the right into engagement with contact 437 arranged to close the circuit to volume-control solenoid 184 to effect a decrease in the volume of the chambers. As indicated in Fig. 12, the continuous stream flowing through the opening 406 of the receptacle 402 and also any material flowing off the top of the receptacle is received in the hopper 10 to be distributed to the measuring chambers 14 during the continuous operation of the machine.

While the preferred embodiment of the invention has been herein illustrated and described, it will be understood that the invention may be embodied in other forms within the scope of the following claims.

Having thus described the invention, what is claimed is:

1. In a packaging machine, in combination, measuring means for intermittently forming successive measured loads, means for supplying flowable solid material in bulk form to the measuring means, means for intermittently removing samples from the bulk supply of the material prior to delivery thereof to the measuring means, check-weighing means cooperating with said sampling means for check weighing predetermined volumes of the sampled material, and means adjustably varying the volume of said measuring means in accordance with predetermined variations of said checked weights from a standard whereby to enable the delivery of measured loads of substantially uniform weight irrespective of variations in the density of the material being supplied to the measuring means.

2. In a packaging machine, in combination, measuring means for intermittently forming successive measured loads, means for supplying flowable solid material in bulk form to the measuring means, means for intermittently removing samples from the bulk supply of the material prior to delivery thereof to the measuring means, means for check weighing predetermined volumes of the material thus sampled, and means for varying the volume of the measuring means in accordance with predetermined variations in the density of the sampled material as determined by said check weighings whereby to enable the delivery of measured loads of substantially uniform weight irrespective of variations in the density of the material being supplied to the measuring means.

3. In a packaging machine, in combination, measuring means adjustable as to volume, means for supplying flowable solid material in bulk form to the measuring means, means for continuously withdrawing a sample stream of material from said bulk supply prior to delivery to the measuring means, means for continuously introducing said stream into a weighing receptacle, said receptacle being provided with a discharge outlet adapted to permit discharge of the material from said receptacle at substantially the same rate as it is introduced therein, means for continuously check weighing the volume of material in the receptacle, and means for varying the volume of the measuring means in accordance with variations beyond predetermined limits of the weight of the material being check weighed whereby to enable the delivery of measured loads of substantially uniform weight irrespective of variations in the density of the material being supplied to the measuring means.

4. In a packaging machine, in combination, a rotary hopper having a plurality of chambers depending therefrom, each chamber being adjustable as to volume, a supply pipe above the hopper terminating a short distance from the bottom thereof and through which the material is supplied in bulk form by gravity to the hopper, means for intermittently withdrawing predetermined sample volumes in succession and at spaced intervals from the supply pipe prior to delivery to said hopper, means for check weighing said sample loads and for introducing said loads into the hopper, and control mechanism operatively connected to said check-weighing means and to said measuring chambers for varying the volume of the measuring chambers when the weights of the loads being check weighed vary from predetermined limits.

5. In a packaging machine, in combination, a rotary hopper provided with a plurality of depending measuring chambers, each adjustable as to volume, means for supplying the material to be measured in bulk form to said hopper by gravity movement thereof downwardly through a vertical supply pipe terminating a short distance above the bottom of the hopper, an intermittently movable receptacle adapted to withdraw successive sample loads of uniform volume from said supply pipe prior to the introduction of said material into the hopper, a check weigher to which said sampled loads are delivered in succession, control means operatively connected to the check weigher and operatively connected to said measuring chambers, said control means operating to vary the volumes of said measuring chambers in accordance with weight variations beyond predetermined limits of said checked weights from a predetermined amount.

6. In a packaging machine, in combination, a rotary hopper provided with a plurality of depending measuring chambers, each adjustable as to volume, means for supplying the material to be measured in bulk form to said hopper by gravity movement thereof downwardly through a vertical supply pipe terminating a short distance above the bottom of the hopper, an intermittently movable receptacle adapted to withdraw successive sample loads of uniform volume from said supply pipe prior to the introduction of said material into the hopper, a check weigher to which said sampled loads are delivered in succession, pneumatic control means operatively connected to the check weigher and operatively connected to said measuring chambers, said control means operating to vary the volumes of said measuring chambers in accordance with variations beyond predetermined limits of said checked weights from a predetermined amount.

7. In a packaging machine, in combination, measuring means for intermittently forming successive measured loads, means for supplying flowable solid material in bulk form to the measuring means, means for intermittently removing samples of the material prior to delivery to the measuring means, check-weighing means cooperating with said sampling means, for check weighing predetermined volumes of the sampled material, and means adjustably varying the volume of said measuring means in accordance with predetermined variations of said checked weights from a standard whereby to enable the delivery of measured loads of substantially uniform weight irrespective of variations in the density of the material being supplied to the measuring means, and means for limiting the adjustment of said measuring chambers in both directions of operation.

8. In a packaging machine, in combination, measuring means for intermittently forming successive measured loads, means for supplying flowable solid material in bulk form to the measuring means, means for intermittently removing samples of the material prior to delivery to the measuring means, check-weighing means cooperating with said sampling means for check weighing predetermined volumes of the sampled material, and means adjustably varying the volume of said measuring means in accordance with predetermined variations of said checked weights from a standard whereby to enable the delivery of measured loads of substantially uniform weight irrespective of variations in the density of the material being supplied to the measuring means, and means for limiting the adjustment of said measuring chambers in both directions of operation, and means for operating a signal when the limit of adjustment of said measuring chambers in either direction is reached.

9. In a packaging machine, in combination, measuring means for intermittently forming successive measured loads, means for supplying flowable solid material in bulk form to the measuring means, means for intermittently removing samples of the material prior to delivery to the measuring means, check-weighing means cooperating with said sampling means for check weighing predetermined volumes of the sampled material, and means adjustably varying the volume of said measuring means in accordance with predetermined variations of said checked weights from a standard whereby to enable the delivery of measured loads of substantially uniform weight irrespective of variations in the density of the material being supplied to the measuring means, and means for preventing adjustment of said measuring means except during a predetermined portion of the cycle of operation of the machine.

10. In a machine of the character described, in combination, means for forming successive measured loads including a plurality of measuring chambers adjustable as to volume, means for supplying material in bulk form to said chambers, means for continuously withdrawing a portion of the material from said supply means prior to forming said measured loads, check-weighing means including a receptacle having an inlet and an outlet through which the material directed thereto by said withdrawing means continuously flows to provide a substantially uniform load in the receptacle at all times, and control means responsive to the operation of said check-weighing means for varying the volume of said measuring chambers in the event that the check-weighing operation indicates a variation in the weight of said uniform load beyond predetermined limits.

11. In a packaging machine, in combination, measuring means for intermittently forming successive measured loads, said means comprising a supply hopper and a plurality of spaced measuring chambers mounted upon and depending from the hopper to be supplied with material therefrom, means for supplying flowable solid material in bulk form to the supply hopper, means for intermittently removing samples from the bulk supply of material prior to its delivery to the hopper of the measuring means, means for check weighing predetermined volumes of the material thus sampled, and means for varying the volume of the measuring chambers in accordance with predetermined variations in the density of the sampled material as determined by said check weighings whereby to enable the delivery of measured loads of substantially uniform weight irrespective of variations in the density of the material being supplied to the measuring means.

12. In a packaging machine, in combination, measuring means for intermittently forming successive measured loads, said means comprising a supply hopper and a plurality of spaced measuring chambers mounted upon and depending from the hopper to be supplied with material therefrom, means for supplying flowable solid material in bulk form to the supply hopper, means for intermittently removing samples from the bulk supply of material prior to its delivery to the hopper of the measuring means, means for check weighing predetermined volumes of the material thus sampled, means for varying the volume of the measuring chambers in accordance with predetermined variations in the density of the sampled material as determined by said check weighings whereby to enable the delivery of measured loads of substantially uniform weight irrespective of variations in the density of the material being supplied to the measuring means, and means for introducing the check weighed material into the supply hopper.

13. In a packaging machine, in combination, measuring means adjustable as to volume, means for supplying flowable solid material in bulk form to the measuring means, means for continuously withdrawing a sample stream of material from said bulk supply prior to delivery thereof to the measuring means, means for continuously introducing said stream into a weighing receptacle, said receptacle being provided with a discharge outlet adapted to permit discharge of the material from said receptacle at substantially the same rate as it is introduced therein, means for continuously check weighing the volume of the material in the receptacle, means for varying the volume of the measuring means in accordance with variations beyond predetermined limits of the weight of the material being check weighed whereby to enable delivery of measured loads of substantially uniform weight irrespective of variations in the density of the material being supplied to the measuring means, of the material being supplied to the measuring means, said means including a member mounted upon and movable with the weighing receptacle, and pneumatic control means operatively connected with said adjustable measuring means and cooperating with said member to initiate the volume correction upon movement of the member into predetermined positions.

References Cited in the file of this patent

UNITED STATES PATENTS

| | | |
|---|---|---|
| 928,658 | Hoyt | July 20, 1909 |
| 2,100,874 | Ryan et al. | Nov. 30, 1937 |
| 2,273,330 | Robinson | Feb. 17, 1942 |
| 2,425,844 | Spaulding | Aug. 19, 1947 |
| 2,616,652 | Rose | Nov. 4, 1952 |
| 2,678,185 | Howard | May 11, 1954 |

FOREIGN PATENTS

| | | |
|---|---|---|
| 334,304 | Great Britain | Sept. 4, 1930 |
| 489,555 | Great Britain | July 28, 1938 |